United States Patent
Cottrell et al.

(10) Patent No.: US 6,619,327 B2
(45) Date of Patent: Sep. 16, 2003

(54) O-RING SEAL FLAT FACE FITTING

(75) Inventors: Michael A. Cottrell, Castle Rock, CO (US); Ronald D. DiFrancia, Montrose, CO (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 10/107,098

(22) Filed: Mar. 25, 2002

(65) Prior Publication Data

US 2002/0135136 A1 Sep. 26, 2002

Related U.S. Application Data

(60) Provisional application No. 60/278,413, filed on Mar. 23, 2001.

(51) Int. Cl.[7] .................................................. F16L 9/00
(52) U.S. Cl. ........................ 138/109; 138/177; 285/21.1
(58) Field of Search ................................ 138/109, 177; 285/21.1, 423

(56) References Cited

U.S. PATENT DOCUMENTS

| | | | |
|---|---|---|---|
| 3,831,951 A | 8/1974 | Patel et al. ................. 277/170 |
| 4,047,739 A | * 9/1977 | Aitken ....................... 285/21.1 |
| 4,258,935 A | * 3/1981 | Rodrigo et al. ............. 285/21.2 |
| 5,131,145 A | 7/1992 | Badoureaux ........... 29/890.144 |
| 5,413,147 A | 5/1995 | Moreiras et al. ............ 138/109 |
| 5,490,680 A | 2/1996 | Patel et al. .................. 277/170 |
| 5,634,674 A | 6/1997 | Fuser .......................... 285/353 |
| 5,806,166 A | 9/1998 | Fuser ........................... 29/523 |
| 5,904,382 A | 5/1999 | Bronnert ..................... 285/349 |
| 5,956,987 A | 9/1999 | Anthoine .................... 72/21.5 |

* cited by examiner

*Primary Examiner*—Patrick Brinson
(74) *Attorney, Agent, or Firm*—S. G. Austin, Esq.; C. H. Castleman, Esq.; J. A. Thurnau, Esq.

(57) ABSTRACT

The present invention is an improved O-ring seal flat face fitting of the type having a male portion including an O-ring, and a female portion having a tube with an inside diameter, an extended peripheral limit having a diameter corresponding to said inside diameter, a nut, and a joinder portion. It is improved by the joinder portion including a void having a portion extending radially beyond the extended peripheral limit.

4 Claims, 4 Drawing Sheets

O-RING SEAL FLAT FACE FITTING

CROSS-REFERENCE TO RELATED APPLICATIONS

This application claims priority to U.S. Provisional Pat. application Ser. No. 60/278,413, filed Mar. 23, 2001 and entitled O-RING SEAL FLAT FACE FITTING. The subject matter of this application is incorporated herein by this reference.

BACKGROUND OF THE INVENTION

1. Field of the Invention

This invention relates generally to hydraulic hose fittings. More particularly, it relates to O-ring face seal fittings. Specifically, it relates to improved female portions of O-ring seal flat faced terminations, for tube and hose fittings.

2. Description of the Prior Art

O-ring seal flat face fittings are known in the art. Typically, the female portion forms part of a separate fitting or connector that connects a hydraulic hose to a machine, equipment, or fixture or is fixed upon or directly a part of a tube that connects the tube to a machine, equipment, or fixture.

In one form of the female portion, the end of a tube is flared to the point of presenting a flat-faced annulus at the tube's open end. The annulus has an inside diameter substantially equal to the inside diameter of the tube from which the annulus is created. The annulus is supported by a collar or sleeve that is brazed, welded, pressed or otherwise affixed upon the tube in a manner well known in the art against the annulus opposite of the flat end facing away from the tube(see FIG. 1).

For connecting the female portion to the male portion, a nut having internal threads covering a portion of its interior and having a reduced diameter unthreaded portion, or shoulder, covering the remaining portion of the nut fits over the tube and about the annulus and the collar or sleeve. The male portion has an O-ring face including a groove for housing an O-ring, and an O-ring therein, and external threads proximate the face having the O-ring. Upon connection, the nut is threaded over the external threads of the male portion. The threading action reduces the distance between the O-ring face and the shoulder of the nut. As the shoulder's inside diameter is less than the outside diameter of at least a portion of the supporting collar or sleeve, the axial restraining portion (enumerated 29 in FIGS. 1 and 2), the annulus and the O-ring face are brought into sealing contact.

In another form of female portion of O-ring face seal fitting, a sleeve which includes a flat end face is brazed, welded or otherwise affixed to the end of the tube. The sleeve has an overall outside shape substantially similar to the combination of the annulus and the support, of the previously described form (see FIG. 2).

Both of these forms have significant disadvantages in both production and operation. First, they both require a separate sleeve to be produced and affixed to the tube, adding to the cost and complexity of producing the female portion of the O-ring seal flat face fitting. Second, this style of fitting has a tendency to loosen, leak, and fail under certain conditions. When the female portion is twisted in relation to the male portion of the fitting, such as under the influences of impacts upon the fitting or vibration, the friction between the female portion and the nut can cause the nut to turn and to loosen. This situation is predominantly related to fittings where the tube is bent as depicted in FIG. 4. In this configuration, side impacts to the fitting creates a moment about the axis of where the male and female portions connect. This, in turn, causes a torque upon the female portion relative to the male portion. However, opportunities for twisting can present themselves where the tube is not bent.

Accordingly, there is a continuing need for an O-ring seal flat faced fitting, including a female portion, of simplified construction that has an improved resistance to leakage brought on by loosening caused by twisting of the tube.

SUMMARY OF THE INVENTION

The present invention has as an object the provision of an O-ring seal flat face fitting, including a female portion, of simplified construction.

The present invention has the further object of the provision of an O-ring seal flat face fitting, including a female portion, having improved resistance to leakage brought on by loosening caused by twisting or vibration of the tube.

The present invention is an improved O-ring seal flat face fitting of the type having a male portion including an O-ring, and a female portion having a tube with an inside diameter, an extended peripheral limit having a diameter corresponding to said inside diameter, a nut, and a joinder portion. It is improved by the joinder portion including a void having a portion extending radially beyond the extended peripheral limit.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
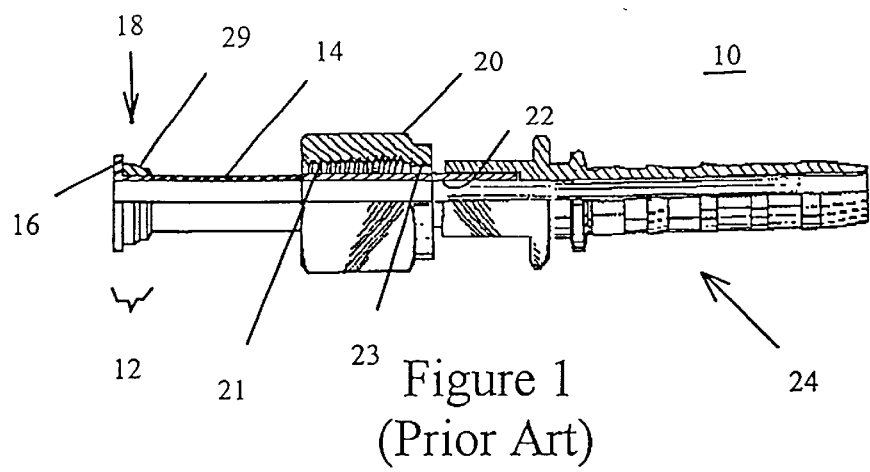
FIG. 1 is an elevation, with one quarter cut away, of a female end of a hydraulic fitting of prior art.
Figure 2:
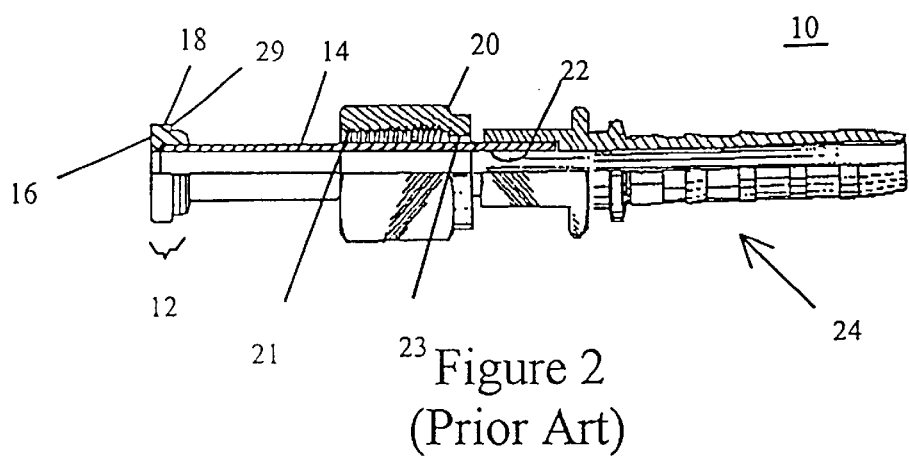
FIG. 2 is an elevation, with one quarter cut away, of a female end of a hydraulic fitting of prior art.
Figure 3:
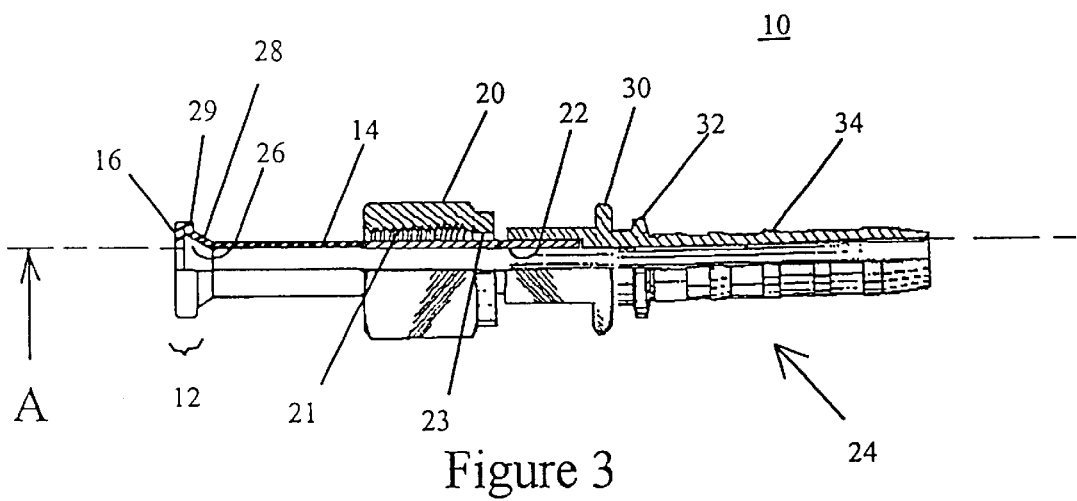
FIG. 3 is an elevation, with one quarter cut away, of a female end of a hydraulic fitting including a preferred embodiment of an O-ring seal flat face.

Referring to FIG. 3, a preferred embodiment of a female portion of an O-ring seal flat face fitting 10 is depicted. Female portion O-ring seal flat face fitting 10 includes joinder portion 12, including camming portion 28 and axial restraining portion 29, tube 14, annulus or flat face 16, nut 20, bore 22, void 26, and hose stem 24 including wrench flats 30, hose stop 32, and barbs 24.

Joinder portion 12 can be formed by various tube forming methods known in the art. However an approach that is well suited to produce such parts, where the parts are of the configuration of FIGS. 3 and 4, and done on a volume basis, is by progressive die forming. Referring to FIGS. 5 through 11, that process is depicted.

Figure 6:
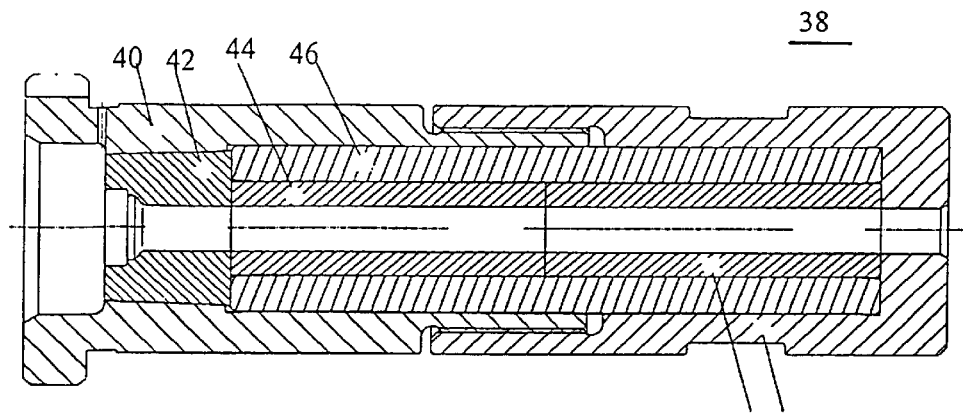
FIG. 6 is an elevation, with one half cut away, of a forming press.
Figure 7:
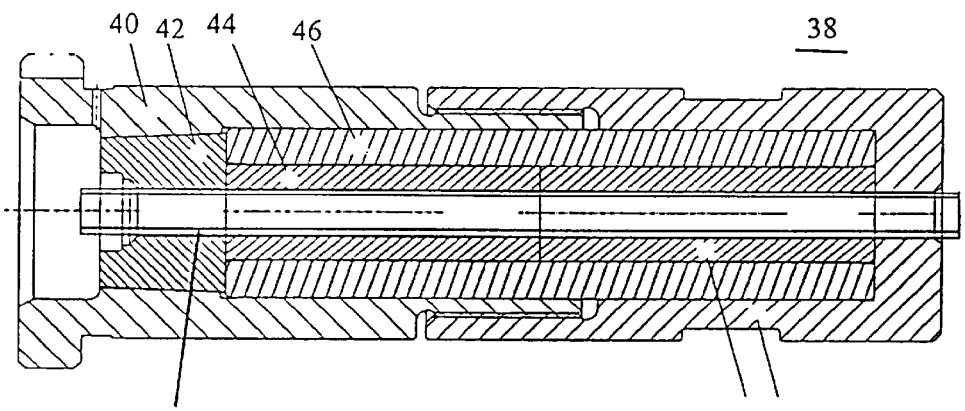
FIG. 7 is an elevation, with one half cut away, of a forming press, including a tube to be formed.
Figure 8:
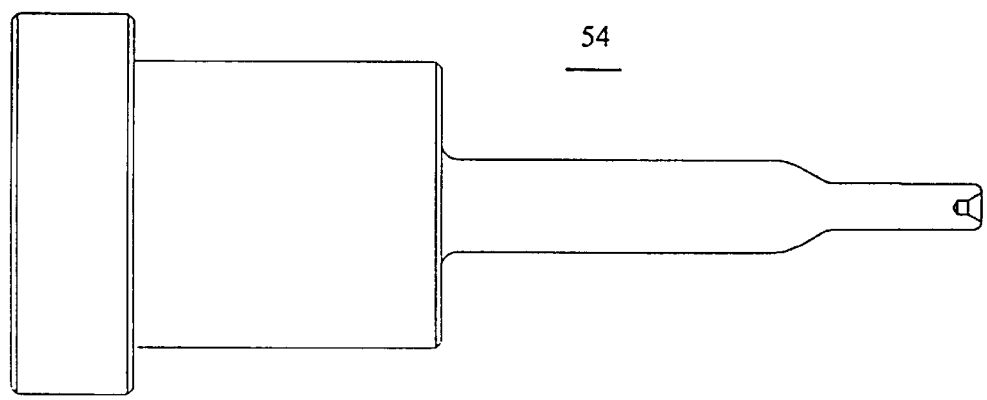
FIG. 8 is an elevation of a first punch.
Figure 9:
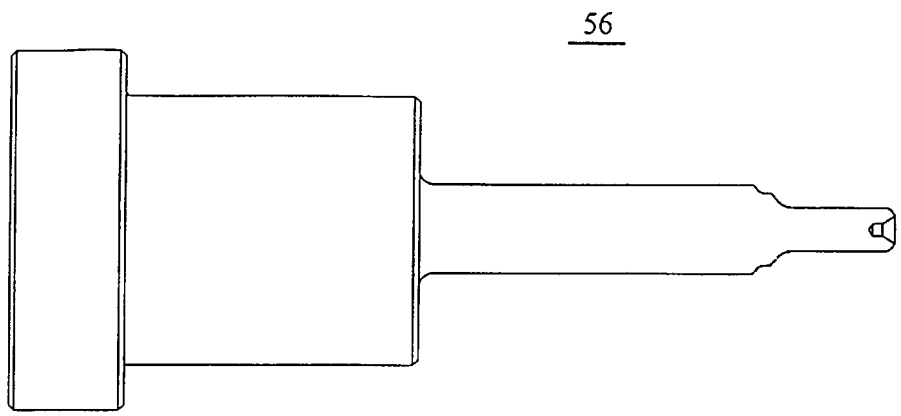
FIG. 9 is an elevation of a second punch.
Figure 10:
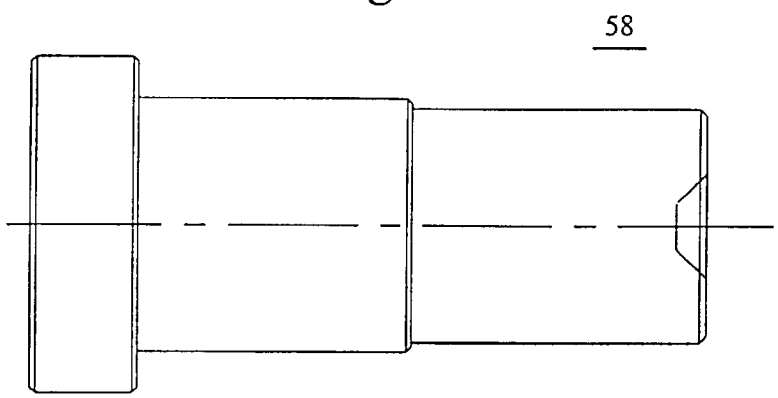
FIG. 10 is an elevation of a third punch.
Figure 11:
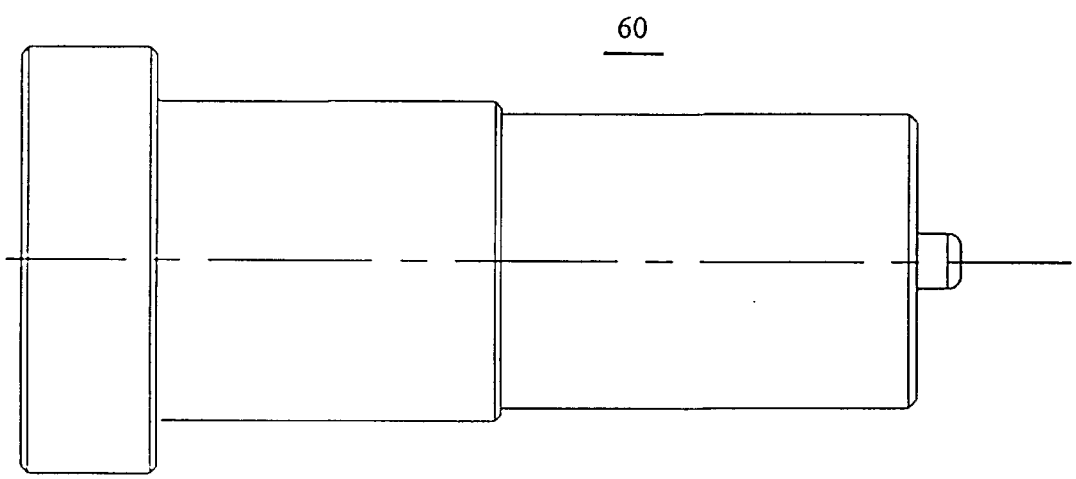
FIG. 11 is an elevation of a fourth punch.

The overall press technique and equipment is well known in the art and not depicted nor fully described here. However, those details specific to producing joinder portion 12 of O-ring seal flat face fitting 10 of the present invention follow. The general configuration of the press is as follows. It has six vertical rotating die stations, die 38 of one of which is depicted in FIG. 6. Each die station holds interchangeable dies 38. Each die 38 has an integral ejection rod (not depicted) that is used to set the length of the part and eject the finished part. The ejection rods can either be of fixed length or be adjusted for length with inserts. There are also four rams (not depicted) with first through fourth punches 54 through 60, respectively, mounted to each ram. An auto lube spray (not depicted) is attached at the load station.

Each die 38 includes upper die shell 40, form insert 42, upper tube insert 44, compression tube 46, lower die shell 48, and lower tube insert 50. Each die is identical and has replaceable components (i.e., form insert 42 of each die can be replaced). Upper die shell 40, upper tube insert 44, compression tube 46, lower die shell 48, and lower tube insert 50 are non-forming areas of the die. These areas are sized slightly larger than tube 14 that is inserted. Tube 14 will expand to fill this over sized area during the forming process and will foreshorten commensurately. Note in FIG. 7 how some of tube 14 extends beyond form insert 42.

At the first station, tube 14 is loaded into die 38. The next four stations include first through fourth punches 54, 56, 58, and 60, respectively, and are capable of applying 25 tons of force each. Stations 1 and 2 each have a stripper plate (not depicted) to separate tube 14 from the respective punch 54 through 60 after forming.

Figure 5A:
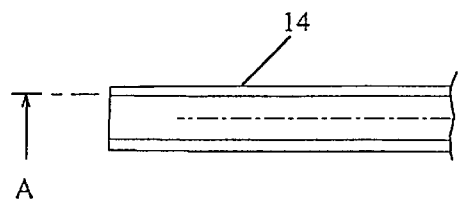
FIGS. 5a through 5e are elevation views, with one half cut away, depicting the progression of forming a preferred embodiment of an O-ring flat face.
Figure 5B:
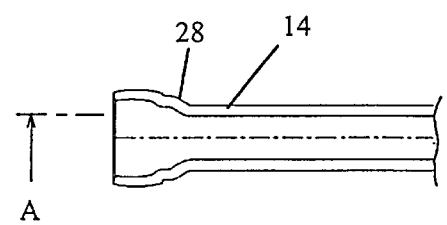
Figure 5C:
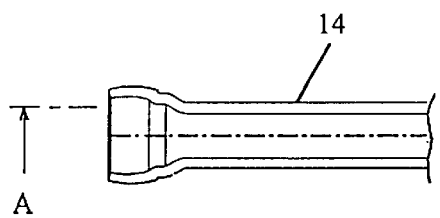
Figure 5D:
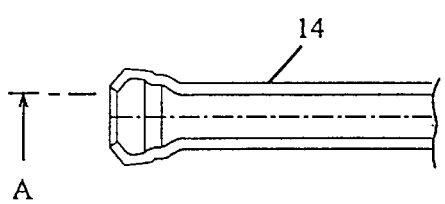
Figure 5E:
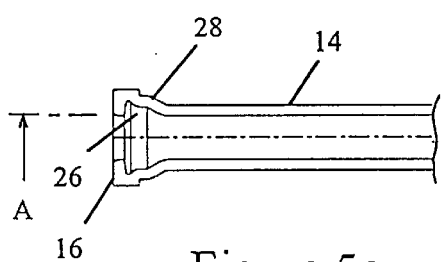

In operation, each size of tubing is cut to length, wire brush deburred, and washed to eliminate extraneous metal particles, all prior to being introduced to the press. The press is prepared with the correct size of die 38, first through fourth punches 54 through 60, respectively, stripper plates, ejection rods (not depicted) and loader rod (not depicted) mounted. The auto loader is adjusted for the corresponding size tubing. A cut and deburred tube 14 is placed over a die 38. A small amount of forming oil is sprayed over tube 14. Tube 14 is driven into die 38 until the ejection rod stops its travel. The loader rod retracts. Die 38 is rotated under first punch 54. This is station 2 where tube 14 is primarily expanded near its opening as depicted in FIG. 5b, but also produces camming portion 28. First punch 54 advances until a fixed stop is contacted. First punch 54 retracts. Die 38 is rotated under second punch 56. This is station 3 where the camming portion 28 of tube 14 is defined as depicted in FIG. 5c. Second punch 56 advances until a fixed stop is contacted. Second punch 56 retracts. Die 38 is rotated under third punch 58. This is station 4 where joinder portion 12 of tube 14 is folded at the area expanded by station 1 over to 45 degrees as depicted in FIG. 5d. Third punch 58 advances until it bottoms out against die 38. Third punch 58 retracts. Die 38 is rotated under fourth punch 60. This is station 5, which continues folding and forming flat face 16. The inside diameter of flat face 16 is formed simultaneously. Fourth punch 60 advances until it bottoms out against die 38. Fourth punch 60 retracts. Die 38 is rotated over an ejection cylinder (not depicted). This is the final station where tube 14 is ejected. The ejection cylinder advances, advancing an ejection rod and formed part until a signal is received. The formed part is now out of die 38 and exposed. A blow-off (not depicted) activates by blowing off the exposed, formed part. The ejection cylinder retracts. The die is rotated under the loading station.

The above operation is listed for one die station. All six die stations are in a circle and as each die station is rotated, all other stations rotate simultaneously. The four punches 54 through 60, respectively, simultaneously advance on four die stations while loading and ejection is also simultaneously being performed.

Before the formed part is sent to other processes, the formed part is sent through a vibrating media. The vibrating media produces a hammered, matte finish on the surface of the formed part and removes any external residual flash.

Figure 4:
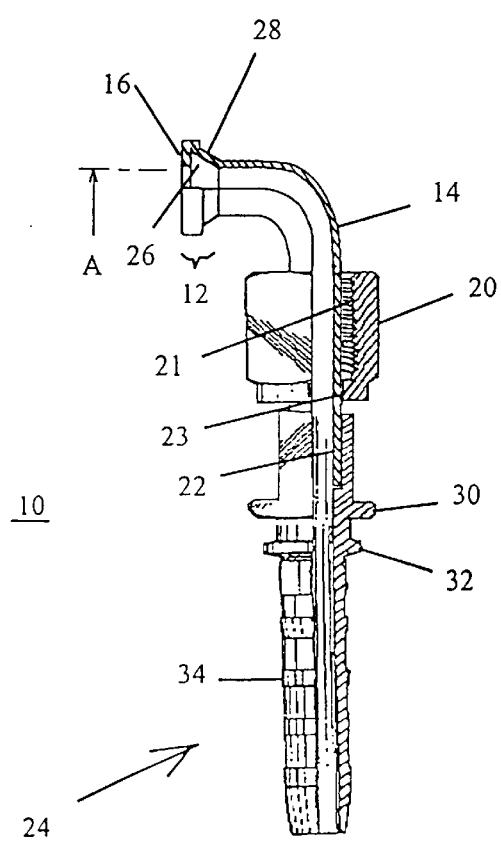
FIG. 4 is an elevation, with one quarter cut away, of a female end of a hydraulic fitting including a preferred embodiment of an O-ring seal flat face, in a bent configuration.

For the configuration depicted in FIG. 4, tube 14 is bent. Nut 20 is placed about tube 14. Hose stem 24 is braised upon tube at the end opposite of flat face 16.

Each punch 54 through 60, respectively, has a separate configuration and has replaceable components at critical forming areas of the punch that contact tube 14 during the forming process.

For those application not involving attachment to a flexible hose (not depicted), hose stem 24 can be omitted. In such case tube 14 extends the distance that would otherwise be completed by the flexible hose.

Note that producing joinder portion 12 of the present invention does not include creating and affixing a separate collar or sleeve 18, thereby reducing cost and complexity.

More significantly, however, void 26 is created. Void 26 is over the volume between extended peripheral limit A and the inside surface of joinder potion 12. Extended peripheral limit A is that conceptual surface that extends linearly from the portion of tube 14 that was not altered by either the joinder portion 12 formation or by the bending of tube 14. Void 26 alters the response of nut 20 when female portion 10 is twisted in relation to the male portion of the fitting. When female portion 20, particularly in the bent configuration of FIG. 4, is struck so as to twist female portion 20 in relation to male portion or vibrated, without void 26, nut 20 tends become loosened from the male portion. If the loosening progresses far enough, the fitting can leak. Thus, the connection experiences a failure. Void 26 decreases this tendency to loosen. It is believed that void 26 allows some give that, in turn, reduces the friction between tube 14 and nut 20 under such conditions. The reduction of friction reduces the tendency of nut 20 to loosen under the described conditions.

The net result is O-ring seal flat face fitting that is both less costly and complex to produce and exhibits an improved resistance to loosening in its working environment due blows, vibration, or other events that may cause twisting of the fitting and ultimate leakage and failure of the fitting.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. An improved O-ring seal flat face fitting of the type having a male portion including an O-ring, and a female portion having a tube with an inside diameter, an extended peripheral limit having a diameter corresponding to said inside diameter, a nut, and a joinder portion, the improvement comprising:

said joinder portion including a void having a portion extending radially beyond said extended peripheral limit.

2. An improved O-ring seal flat face fitting of the type having a male portion including an O-ring, and a female portion having a tube with an inside diameter, a nut, and a joinder portion, the improvement comprising:

said joinder portion including a camming portion formed integral to said tube.

3. An improved O-ring seal flat face fitting of the type having a male portion including an O-ring, and a female portion having a tube with an inside diameter, an extended peripheral limit having a diameter corresponding to said inside diameter, a nut, a flat face, and a joinder portion, the improvement comprising:

said flat face and joinder portion being one piece and said joinder portion including a void having a portion extending radially beyond said extended peripheral limit.

4. An improved O-ring seal flat face fitting of the type having a male portion including an O-ring, and a female portion having a tube with an inside diameter, a nut, a flat face, and a joinder portion, the improvement comprising:

said joinder portion, including a camming portion, and said flat face formed integrally to said tube.

* * * * *